United States Patent [19]

Kalendra et al.

[11] Patent Number: 5,283,559
[45] Date of Patent: Feb. 1, 1994

[54] AUTOMATIC CALIBRATION OF A CAPACITIVE TOUCH SCREEN USED WITH A FIXED ELEMENT FLAT SCREEN DISPLAY PANEL

[75] Inventors: Paul W. Kalendra; William J. Piazza, both of Boca Raton, Fla.

[73] Assignee: International Business Machines Corp., Armonk, N.Y.

[21] Appl. No.: 947,688

[22] Filed: Sep. 21, 1992

[51] Int. Cl.⁵ .............................. G09G 5/00
[52] U.S. Cl. ........................ 345/168; 345/156
[58] Field of Search ............... 340/706, 712; 178/18, 178/19, 20; 341/32, 33

[56] References Cited

U.S. PATENT DOCUMENTS

| | | | |
|---|---|---|---|
| 4,305,135 | 12/1981 | Dahl et al. | 341/33 |
| 4,476,463 | 10/1984 | Ng et al. | 340/712 |
| 4,529,967 | 7/1985 | Gifft | 341/32 |
| 4,680,429 | 7/1987 | Murdock et al. | 178/19 |
| 4,707,845 | 11/1987 | Krein et al. | 178/19 |
| 4,710,758 | 12/1987 | Mussler et al. | 340/712 |
| 4,710,759 | 12/1987 | Fitzgibbon | 340/712 |
| 4,737,773 | 4/1988 | Kobayashi | 340/707 |
| 4,745,565 | 5/1988 | Garwin et al. | 364/571 |
| 4,853,498 | 8/1989 | Meadows et al. | 178/19 |
| 4,903,012 | 2/1990 | Ohuchi | 340/709 |
| 4,929,935 | 5/1990 | Rysavy et al. | 340/712 |
| 5,008,657 | 4/1991 | Hanson et al. | 340/766 |

OTHER PUBLICATIONS

IBM Technical Disclosure Bulletin, "Self-Calibration and Coordinate Conversion for a Touchpad or Touch Screen Computer Input Device", vol. 30, No. 4, Sep. 1987, pp. 1663-1666.

Primary Examiner—Alvin E. Oberley
Assistant Examiner—V. Chang
Attorney, Agent, or Firm—Romualdas Strimaitis

[57] ABSTRACT

A touch screen display is automatically calibrated during periods of active use or extended periods of non-use. Calibration contacts are cemented or embedded to the surface of a touch sensitive panel, and electrically connected to a reference during calibration. The reference is either electrical ground or a resistive, capacitive, or inductive load.

19 Claims, 5 Drawing Sheets

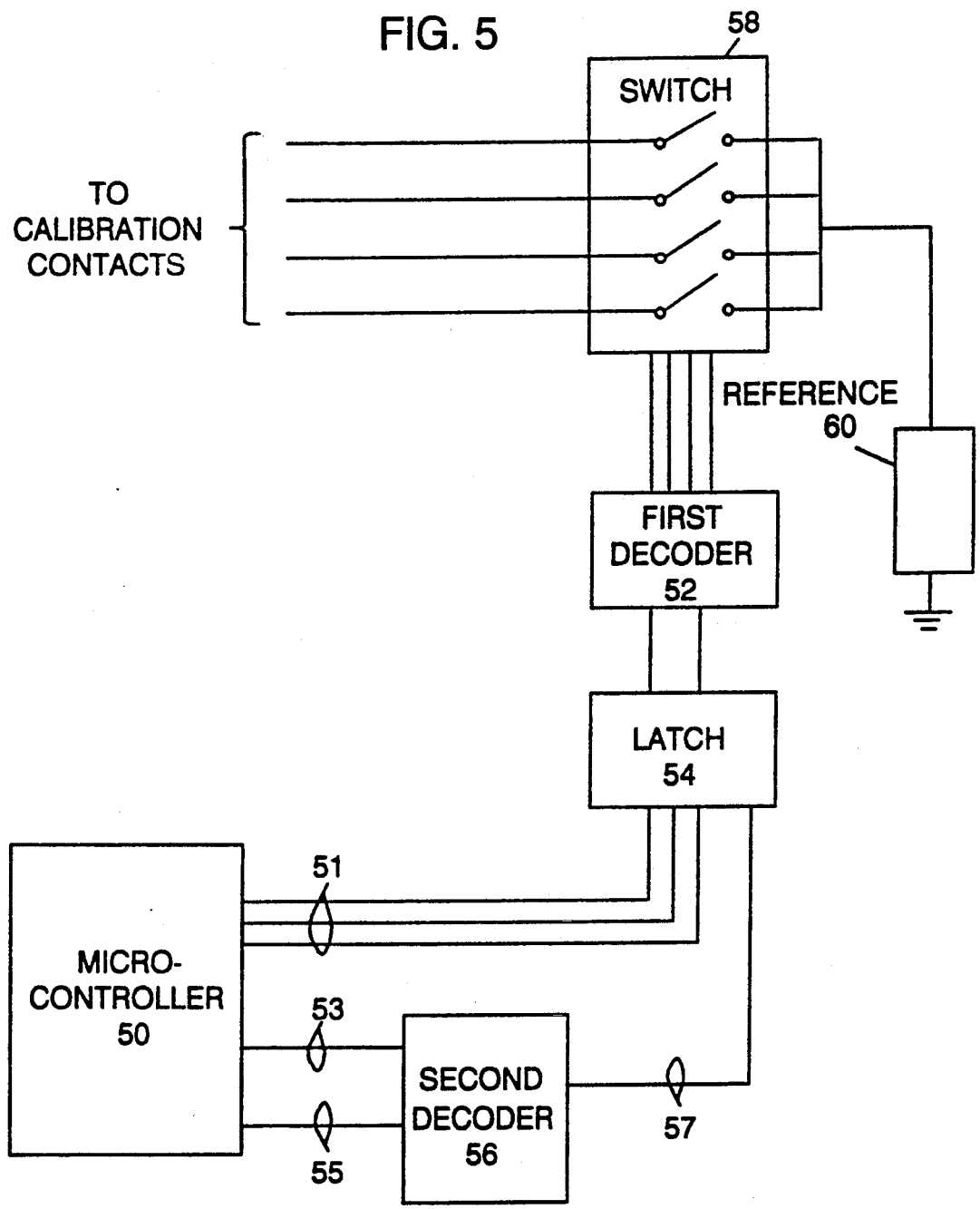

AUTOMATIC CALIBRATION OF A CAPACITIVE TOUCH SCREEN USED WITH A FIXED ELEMENT FLAT SCREEN DISPLAY PANEL

FIELD OF INVENTION

The field of the invention is touch or pressure sensitive panels wherein the location, in a work area, of an applied force is employed as data in a computer system. The work area is usually the face of a touch sensitive panel overlaying a display screen and particularly, the field of the invention is directed to a means of automatically calibrating such an input device.

BACKGROUND OF THE INVENTION

Touch sensitive panels overlaying a display terminal screen are well known. The terminal responds to a touch at any location within a work area on the touch sensitive panel and identifies the location of the touched section. Such a system typically employs a capacitive sensing technique. Capacitive sensing systems typically have a controller which continually transmits a scanning signal across the touch panel and samples the work area until a touch is detected. When an area on the touch sensitive panel is touched by a user, the capacitance of the user's body is added to the circuit. The controller senses the resulting change in capacitance and identifies the specific situs touched.

As the reliability of touch sensitive input devices has improved, and diversity of application software expanded, touch sensitive devices, as a method of input, should be expected to be more widely used since no training is required to learn how to use such input devices. Thus, the computer user is not required to be a proficient typist or to know how to use an input device or computer. The hardware configuration is one that may be used without an alternate input device, such as a keyboard, offering flexibility in terms of space and portability. Applications using this sort of touch sensitive input device already include, and certainly are not limited to, diagnostic analysis, retail point of sale terminals, simulated aircraft flight controls, locator or informational displays, interactive educational systems, machine control, or keyboardless entry systems.

Capacitive touch screen devices are sensitive to changes caused by component temperature, component age, and stray capacitances. The devices must therefore be calibrated before initial use and periodically thereafter in order to maintain accuracy. The calibration process typically used with prior art technology involves displaying a mark in the active video area of the display screen, asking the user to touch the calibration mark as viewed on the overlaying touch sensitive panel, and then having an internal touch controller read and store touch position information. This is then repeated typically 2 to 8 times. The results of the calibration measurements are quantified by the touch controller as deviations from a standard, or otherwise as a set of correction factors, and are stored within the touch controller circuitry. After calibration, the touch controller automatically applies the correction factors to each new touch so that the coordinates sent to the host system are as accurate as can possibly be made. However, this process has the undesired step of external operator intervention in order to perform calibration.

A need thus exists for an apparatus which provides a means to automatically calibrate a touch sensitive panel used in conjunction with a fixed element display system.

OBJECTS OF THE INVENTION

An object of the present invention is to provide an apparatus to automatically calibrate a touch sensitive panel used in conjunction with a fixed element display system.

Another object of the present invention is to provide an apparatus to automatically calibrate a touch sensitive panel used in conjunction with a fixed element display system periodically during active use.

Still another object of the present invention is to provide an apparatus to automatically calibrate a touch sensitive panel used in conjunction with a fixed element display system after extended periods of non-use.

A further object of the present invention is to provide an automatic touch screen calibration method which requires no operator contact or initiation.

SUMMARY OF THE INVENTION

The touch sensitive input device according to the present invention includes a fixed element display, a touch sensitive panel and a touch screen controller. The touch sensitive panel overlays the fixed element display in such a way that an image and/or target points are viewable through the touch sensitive panel. Further, a touch may be selectively applied to any location on the touch sensitive panel. The location or coordinates of an applied touch may be within a field, or in response to a choice, on the image provided on the underlying fixed element display and further serve as a method of data input or interactive use.

The touch screen controller provides a means for translating the touch situs on the touch sensitive panel to an indicated coordinate on the fixed element display. The touch screen controller further provides a means for correcting the alignment of the touch sensitive panel with the fixed element display. As to this alignment correction means, the touch screen controller corrects, or otherwise adjusts, any misalignments between the touch situs or coordinates on the touch sensitive panel and the target situs or coordinates on the fixed element display.

The invention uses calibration contacts either cemented to the surface of the capacitive touch sensitive panel or embedded into the product housing that will make contact with the surface of the touch sensitive panel when assembled. The invention further provides a means of selecting an individual calibration contact for grounding or otherwise connecting to a resistive, capacitive, or inductive load. The selecting means is automatically enabled periodically during use, or during extended periods of non-use. In so doing, the calibration contact and load may simulate a resistive, capacitive, or inductive load that otherwise would be introduced by an operator during a manual calibration procedure. As a result, the invention provides a completely automatic calibration by grounding, or otherwise selecting, individual calibration contacts with all the measurements required to compute correction factors.

BRIEF DESCRIPTION OF DRAWINGS

FIG. 5 is a block diagram of the selection means in accordance with the present invention.

DETAILED DESCRIPTION OF THE INVENTION

Figure 1:
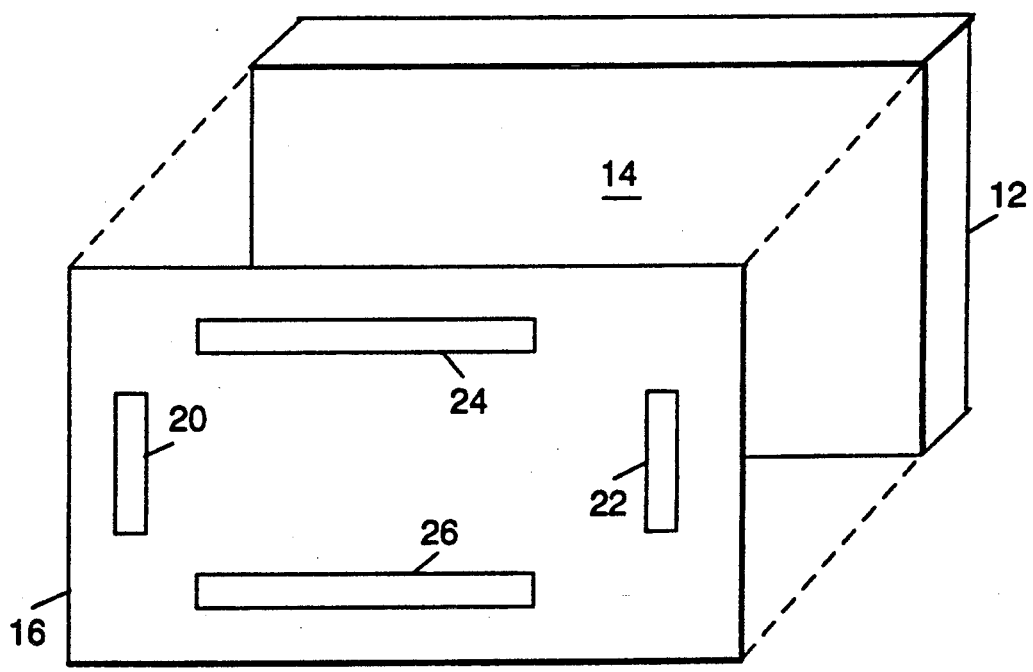
FIG. 1 illustrates the arrangement of the display screen, touch sensitive panel, and transducers.
Figure 3:
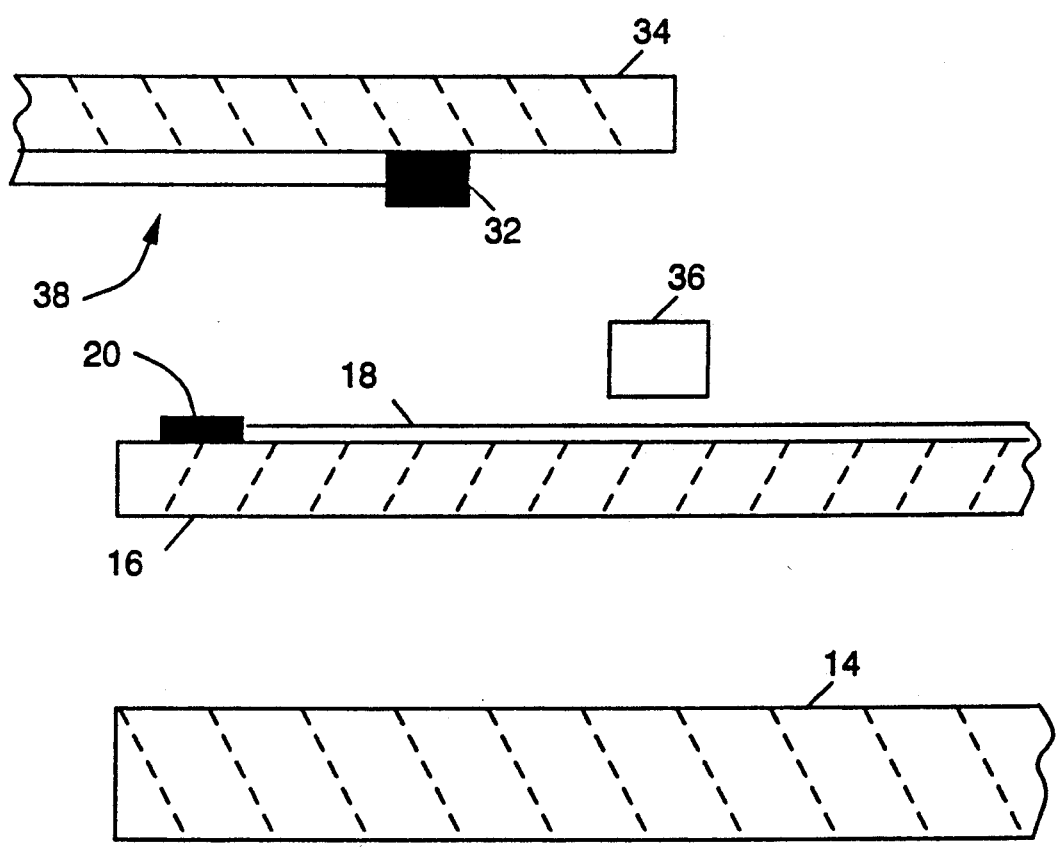
FIG. 3 is a partial side view of the display terminal, illustrating a calibration contact embedded in the touch screen enclosure.

The assembly in FIG. 1 is used in a touch sensitive display terminal. It includes a display unit 12 having a display screen 14. The illustrated display unit 12 is a fixed element display terminal and accordingly the display screen 14 is the face of the fixed element display terminal. An optically transparent touch sensitive panel 16 is affixed to the terminal over the display screen 14 so that the screen is visible through the touch panel. The touch sensitive panel 16 has an electrically conductive coating 18 (as shown in FIG. 3) over its entire surface. The conductive coating is unpatterned in that it extends continuously over the entire display screen 14 or over whatever portion thereof is to display user selectable items.

Figure 2:
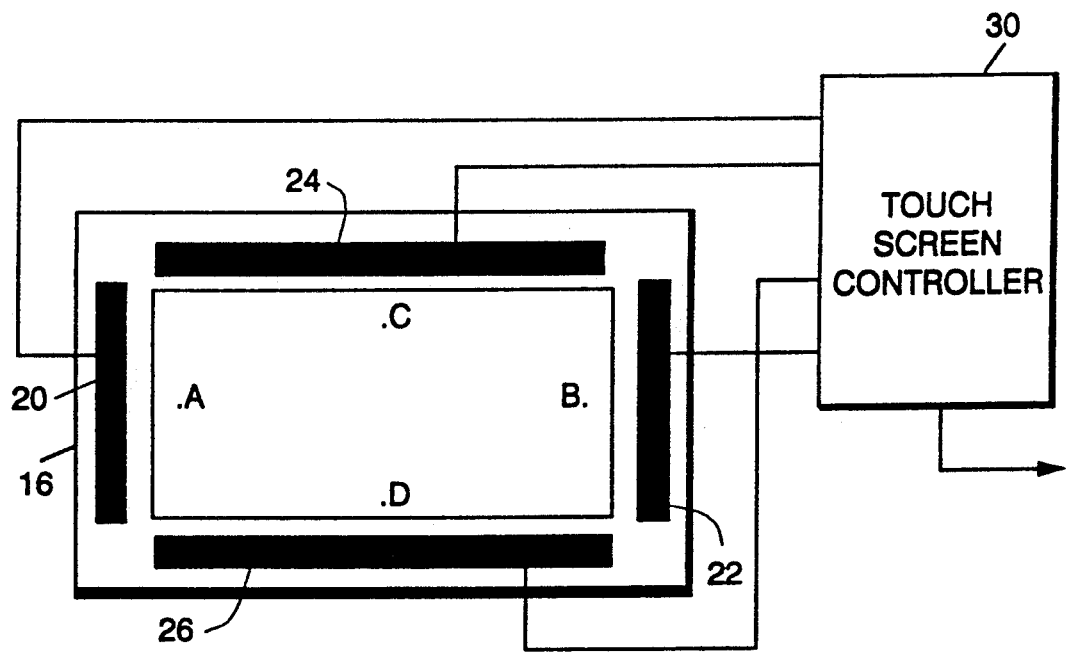
FIG. 2 is a front view of a touch sensitive panel in accordance with the present invention.

Four transducers 20, 22, 24, and 26 are affixed to the touch sensitive panel 16 and connected electrically to the conductive coating 18. The transducers 20 and 22 are at the opposite, horizontally separated, peripheral side edges of the touch sensitive panel and are elongated to extend along the touch sensitive panel edges opposite to and parallel with one another. The other pair of transducers 24 and 26 likewise are vertically spaced apart at opposite peripheral side edges of the touch sensitive panel opposite and parallel with one another. When the touch screen 16 is mounted and calibrated, the transducers (20-26) are attached to the touch sensitive panel 16 at fixed locations relative to the terminal screen 14 so that the determination of a location on the touch sensitive panel 16 relative to the four transducers 20-26 corresponds in a known manner to a location on the display terminal screen 14. Therefore, by determining the location on the touch sensitive panel 16, a corresponding determination is made of the location on the display screen 14. FIG. 2 further illustrates the arrangement of the touch sensitive panel 16, transducers 20-26, and a touch screen controller 30 for providing a means for translating the physical touch situs on the touch sensitive panel 16 to an indicated coordinate on the fixed element display, as hereinafter described.

The method of determining X and Y coordinates for a touch situs on the touch sensitive panel 16 is disclosed, for example, in U.S. Pat. No. 4,680,429 and hereby incorporated by reference. In U.S. Pat. No. 4,680,429, a function generator or signal source (not shown) generates an alternating current voltage touch panel scanning signal. The signal is amplified and applied to the primary winding of a touch panel driving transformer (not shown). The amplified signal drives the secondary winding of the transformer and establishes an alternating current voltage across the secondary winding of the transformer. A multiplexer or switching circuit (not shown) applies panel scanning signals from the outputs of the secondary winding of the driving transformer to selected transducers (20-26). In response to these scanning signals, panel output or touch current signals are generated at the center tap of the transformer when the touch sensitive panel is touched. The touch current signals are processed by a panel output signal means, filtered, rectified, integrated, and digitized. A microprocessor, for example, then computes the touch location and other information from the touch current signals. The microprocessor (not shown) interacts with the host computer (not shown) which is connected to the display unit 12. For example, the host computer may cause selected information to be displayed on the screen 14. Also, the computer may change the displayed information as determined by software in the computer, depending upon the location on the touch sensitive panel 16 which is touched by the user.

FIG. 3 shows a side view of a partially disassembled portion of the present invention. The optically transparent touch sensitive panel 16 overlays, and is affixed to, the display screen 14. The touch sensitive panel 16 has an electrically conductive coating 18 over its entire surface or whatever portion of the screen 14 which is used to display user-selectable items. Also shown is one of the transducers 20 (as representative) affixed to the touch sensitive panel 16. A calibration contact 32 may be either cemented to the surface of a capacitive touch sensitive panel, or embedded between an insulating enclosure 34 and touch sensitive panel 16, making contact with the surface of the touch sensitive panel when assembled. In either embodiment, the insulating enclosure 34 and a gasket or seal 36 are provided to electrically insulate the touch sensitive panel 16 and calibration contact 32 from undesired external sources or stray capacitance over the entire perimeter of the touch sensitive panel 16. Further, an insulated conductor 38 is provided for each calibration contact so as to provide a single point of contact between any calibration contact 32 and a selection means. The selection means may be a set of electromechanical or solid state relays and control logic which allows a desired calibration contact 32 to make electrical contact to a reference 60 (FIG. 5) by changing a set of control lines.

Figure 4:
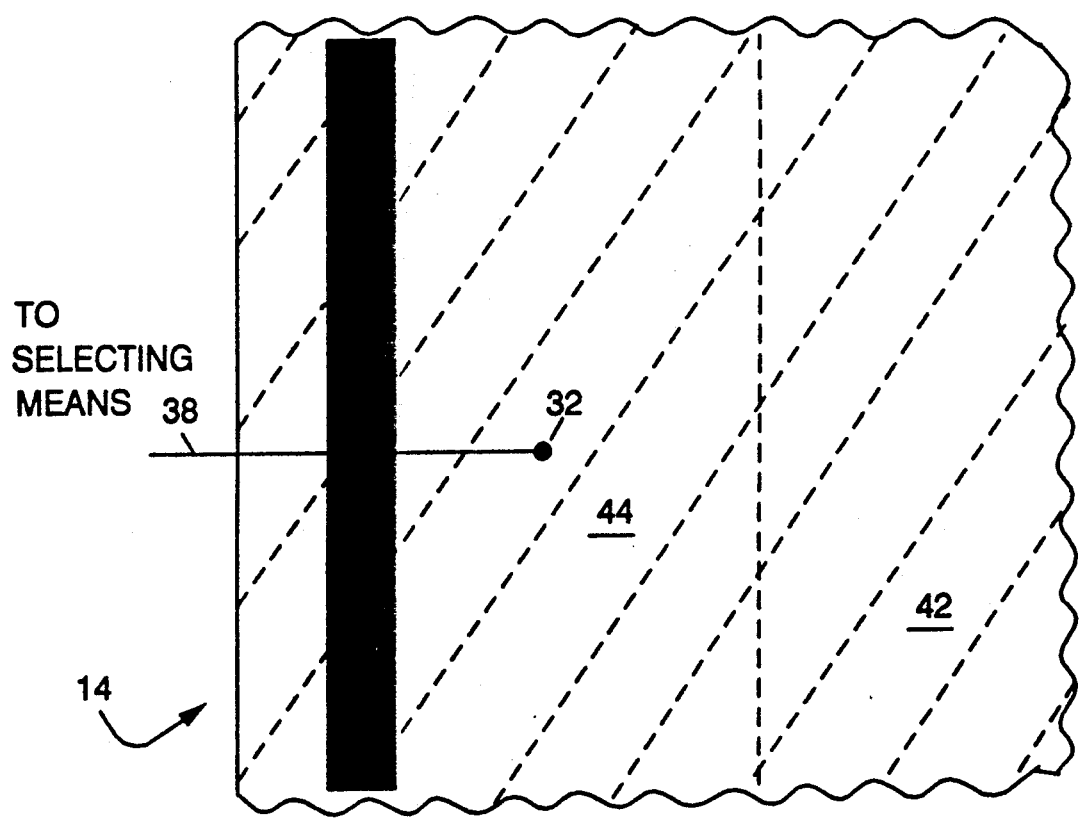
FIG. 4 is a partial top view of the display screen, illustrating a calibration contact cemented to the touch sensitive panel.

Referring to FIG. 4, the display screen 14 offers an active video display area 42 as well as an inactive display area 44 about the periphery of the active video display area 42. The active display area 42 comprising the area of the screen 14 which is used to view data or information displayed by the host system (not shown). In the preferred embodiment, each calibration contact 32 is kept outside the active video area 42 so that a calibration contact 32 and conductor 38 leading to it does not interfere with the user's view of the active video display area 42.

Referring to FIG. 5, a selection means employing a microcontroller 50, first decoder 52, latch 54, second decoder 56 and analog switch 58 are connected to each calibration contact 32. The switch 58 employs, in effect, an independently operable contact for each calibration contact 32. The contacts may be a relay or solid state device such as a field effect transistor (FET) switch.

The operation of the contacts is controlled by a signal from the first decoder 52. The signal which controls the individual contacts of the switch 58 is generated by the microcontroller 50 and applied to a data bus 51. The microcontroller's circuitry places the desired data value on the data bus 51, a specified I/O address to the address bus 53, and a control signal to the control bus 55 to indicate that a memory write or I/O cycle is taking place. The latch 54 allows the microcontroller 50 to store the signal applied to the data bus 51 by executing a memory write, or output, instruction. The second decoder 56, produces a latching pulse at the appropriate time (upon proper control signal) to indicate that the data bus value should be stored in latch 54, thereby allowing the microcontroller to perform other functions while a desired state of the switch 58 contacts is maintained. In an alternate embodiment, the decoder 52 may be eliminated and the individual contacts of the switch 58 may be controlled directly through latch 54.

During calibration, when any of the contacts of the switch 58 are closed, the corresponding calibration contact 32 bonded to the surface of the touch sensitive screen 16 is electrically connected to a reference 60. The reference 60 provides a means for grounding, or otherwise connecting, the calibration contact 32 to a resistive, capacitive, or inductive load. The nature of the reference 60 potential is one that simulates a touch or force applied to the touch sensitive screen 16.

When the touch screen controller 30 makes a touch screen measurement with the reference 60 electrically connected to the touch screen, it will arrive at a different result than it would have if the reference 60 had not been applied. Therefore, by connecting the reference 60 and making a measurement of the indicated coordinates, the touch screen controller 30 is able to determine the effect of a simulated touch having specific, known coordinates on the touch screen. After each of the calibration contacts 32 has been selected, a calibration correction factor is developed based on the difference between the indicated coordinates and corresponding known coordinates for each calibration contact 32. The relationship between the indicated coordinates and known coordinates is stored in the touch screen controller 30 and applied as a correction factor.

In the preferred embodiment of the invention, the selection means is placed under the control of the touch screen controller 30. The calibration process may begin at any time, without explicit intervention of the user or host computer. Typically, an automatic recalibration may be done each time the system is powered up, at periodic intervals during use (based upon a timer function within the touch screen controller 30), or after extended periods of inactivity. In so doing, the invention provides a completely automatic calibration procedure by grounding (or otherwise selecting) individual calibration contacts with all the measurements required to compute correction factors.

If a user should happen to touch the screen while the recalibration process is taking place it will result in a new set of parameters which are drastically different from the desired set. The touch screen controller 30 is programmed to compare the difference between old and new parameters to a preset threshold and, finding that the new values are significantly different, would reject them and attempt to recalibrate itself at a later time. Repeated failures to recalibrate would be reported as a potential hardware failure.

While the invention has been described above in connection with a preferred embodiment therefore as illustrated by the drawings, those of skill in the art will readily recognize alternative embodiments of the invention can be easily produced which do not depart from the spirit and scope of the invention as defined in the following claims.

We claim:

1. An automatic calibrating touch screen apparatus, for introducing data into a data processing device, said data being indicative of the location of a localized touch applied at a touch situs, comprising:
   a fixed element display;
   a touch sensitive panel overlaid on said fixed element display, said touch sensitive panel having an electrically conductive coating;
   at least one calibration contact affixed to said touch sensitive panel on said electrically conductive coating;
   means for controlling a translation of a set of touch coordinates to a set of target coordinates utilizing a correction factor;
   means, responsive to said controller means, for selecting at least one of said calibration contacts, and for generating said correction factor;
   a reference, selectable by said selecting means, applied to said calibration contact;
   an insulated wire for each said calibration contact, a first end of said wire terminating at said calibration contact on said touch sensitive panel, a second end of said wire terminating at said selecting means.

2. The device as in claim 1, further comprising:
   a plurality of transducers, disposed on the front of said touch sensitive panel, for converting a physical touch to an electrical signal.

3. The device as in claim 1:
   an insulating enclosure for containing said touch sensitive panel; and
   a gasket interposed between the front of said touch sensitive panel and said insulating enclosure.

4. The device as in claim 2, wherein:
   said touch sensitive panel further comprises an active video area and an inactive video area, wherein said calibration contact is interposed in said inactive video area.

5. The device as in claim 4, wherein:
   said selecting means is enabled periodically during active use.

6. The device as in claim 4, wherein:
   said selecting means is enabled periodically during periods of non-use.

7. An automatic calibrating touch sensitive input device having a fixed element display, a touch sensitive panel overlaid thereon, comprising:
   means for controlling the translation of the location of a touch situs on said touch sensitive panel with a corresponding target situs on said fixed element display to generate a set of target coordinates, said controller means including a correction factor;
   at least one calibration contact on said touch sensitive panel, each said calibration contact having a corresponding set of known coordinates on said fixed element display, and means for selecting any said calibration contact to simulate a touch applied to the front of said touch sensitive panel, said selection means further generating said correction factor to correct any variance between the location of any said calibration contact and said corresponding set of known coordinates.

8. The device as in claim 7, further comprising:
   a plurality of transducers, disposed on the front of said touch sensitive panel, for converting a physical touch to an electrical signal.

9. The device as in claim 8, wherein:
   said touch sensitive panel further comprises an active video area and an inactive video area, wherein said calibration contact is interposed in said inactive video area.

10. The device as in claim 9, further comprising:
    an insulated wire for each said calibration contact, said insulated wire having a first end and a second end, the first end of said wire terminating at said calibration contact, the second end of said wire terminating at said selecting means.

11. The device as in claim 9 further comprising:
an insulating enclosure for containing said touch sensitive panel; and
a gasket interposed between the front of said touch sensitive panel and said insulating enclosure.

12. The device as in claim 10, wherein:
said selecting means is enabled periodically during active use.

13. The device as in claim 10, wherein:
said selecting means is enabled periodically during periods of non-use.

14. A method for providing calibration information to a touch sensitive input device having a touch screen controller, which translates the location of a touch situs to a target situs having a set of target coordinates on a fixed element flat screen display, said method comprising the steps of:
selecting a calibration contact from a plurality of known calibration contacts, said calibration contact having a set of known coordinates;
providing a simulated touch by completing an electrical contact between the selected calibration contact and a reference, said step of providing a simulated touch further providing a set of indicated touch coordinates;
establishing a correction factor to align said indicated touch coordinates with said known coordinates, for each said known calibration contact selected, and
providing said correction factor to said touch screen controller.

15. The method as in claim 14, wherein:
the step of selecting a calibration contact is performed periodically during active use.

16. The method as in claim 14, wherein:
the step of selecting a calibration contact is performed periodically during periods of non-use.

17. A method for automatically calibrating a touch sensitive input device having a touch screen controller, said method comprising the steps of:
providing a simulated touch by completing an electrical contact between a calibration contact, having a set of known coordinates, and a reference, said step of providing a simulated touch further providing a set of indicated touch coordinates;
establishing a correction factor to align the location of said set of indicated touch coordinates with the location of said set of known coordinates, for each said known calibration contact selected, and
providing said correction factor to said touch screen controller.

18. The method as in claim 17, wherein:
the step of selecting a calibration contact is performed periodically during active use.

19. The method as in claim 17, wherein:
the step of selecting a calibration contact is performed periodically during periods of non-use.

* * * * *